(12) United States Patent
Jones et al.

(10) Patent No.: US 8,281,706 B2
(45) Date of Patent: Oct. 9, 2012

(54) SEALING DEVICE

(75) Inventors: Sigismund Jones, Neu-Anspach (DE); Van Doan Nguyen, Neu-Anspach (DE)

(73) Assignee: Ixetic Bad Homburg GmbH, Bad Homburg (DE)

( * ) Notice: Subject to any disclaimer, the term of this patent is extended or adjusted under 35 U.S.C. 154(b) by 711 days.

(21) Appl. No.: 12/517,173

(22) PCT Filed: Nov. 15, 2007

(86) PCT No.: PCT/EP2007/009856
§ 371 (c)(1),
(2), (4) Date: Jun. 1, 2009

(87) PCT Pub. No.: WO2008/064772
PCT Pub. Date: Jun. 5, 2008

(65) Prior Publication Data
US 2010/0077917 A1    Apr. 1, 2010

(30) Foreign Application Priority Data

Dec. 1, 2006 (DE) .......................... 10 2006 058 235
Jun. 21, 2007 (DE) .......................... 10 2007 028 679

(51) Int. Cl.
*F01C 9/00* (2006.01)
*F01C 19/10* (2006.01)
(52) U.S. Cl. .......................................... 92/125; 92/121
(58) Field of Classification Search ................ 92/121, 92/125; 418/136, 145
See application file for complete search history.

(56) References Cited

U.S. PATENT DOCUMENTS

| | | | |
|---|---|---|---|
| 5,492,051 A | 2/1996 | Schiffler et al. | |
| 6,880,451 B2 * | 4/2005 | Beilner et al. | 92/125 |
| 2004/0134345 A1 | 7/2004 | Beilner et al. | |

FOREIGN PATENT DOCUMENTS

| | | |
|---|---|---|
| DE | 43 37 815 C1 | 2/1995 |
| DE | 43 39 527 C1 | 2/1995 |
| DE | 199 26 644 C1 | 8/2000 |
| DE | 199 18 665 A1 | 10/2000 |
| DE | 199 61 239 A1 | 7/2001 |
| DE | 100 21 138 A1 | 10/2001 |
| DE | 102 43 697 A1 | 1/2004 |
| DE | 102 43 696 B3 | 3/2004 |
| EP | 1 061 266 B1 | 12/2000 |
| EP | 1 150 018 A | 10/2001 |
| JP | 2006-264993 A | 10/2006 |

OTHER PUBLICATIONS

English translation of Japanese Office Action for parallel Japanese application JP 2009-538610, issued Jun. 22, 2012 and mailed Jul. 3, 2012.

* cited by examiner

*Primary Examiner* — Thomas E Lazo
(74) *Attorney, Agent, or Firm* — Harness, Dickey & Pierce, P.L.C.

(57) ABSTRACT

A sealing device for a swivel motor includes an outer part and an inner part as well as at least one working chamber located between them. The sealing device seals the working chamber and comprises at least two rectangular sealing elements housed in a groove enclosed in the outer and/or inner part running essentially parallel to the swivel axis of the swivel motor. Each of the sealing elements comprises at least one rectangular sealing part and at least one gasket.

22 Claims, 4 Drawing Sheets

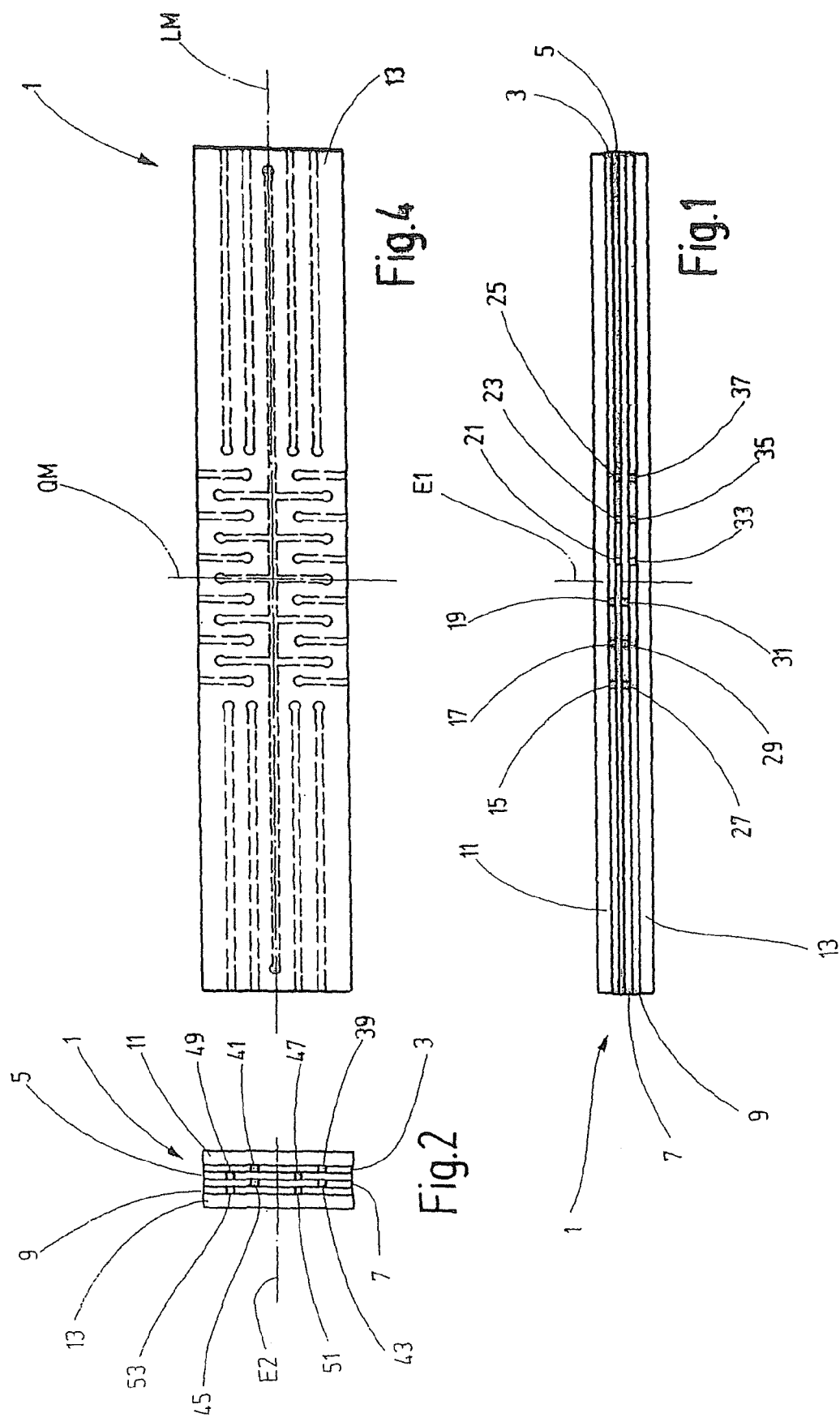

SEALING DEVICE

CROSS-REFERENCE TO RELATED APPLICATIONS

This application is a 371 U.S. National Stage of International Application No. PCT/EP2007/009856, filed Nov. 15, 2007. This application claims priority to German Patent Applications No. DE 10 2006 058 235,7, filed Dec. 1, 2006 and DE 10 2007 028 679.3, filed Jun. 21, 2007, the disclosures of which applications are expressly incorporated herein by reference.

FIELD OF THE INVENTION

The invention relates to a seal device for a swivel motor.

DESCRIPTION OF THE RELATED ART

Sealing devices of the type referred to are known DE 43 37 815 C1). They are used in swivel motors which comprise an outer part, an inner part and at least one working chamber located between these parts which are sealed by sealing elements of the seal device. It contains another sealing element which moves within the working chamber and divides the working chamber into two sections. It has been shown that in many cases the sealing properties of known sealing devices are not sufficient and that under certain operating conditions undesired internal leakage occurs. As a rule, sealing elements are not used directly in the inner surface of the outer part and the outer surface of the inner part, but instead on the ends of the wings which protrude from the named surfaces.

The task of the invention is therefore to create a sealing device that avoids this disadvantage.

SUMMARY OF THE INVENTION

A sealing device is proposed that comprises a swivel motor, which comprises an outer part, an inner part and a working chamber between them. These are sealed by the sealing device, that is, by the sealing elements of the sealing device. Another sealing element moves inside the working chamber. In the outer and/or inner part of the swivel motor, there are notches in the direction of its swivel axis in the outer part and/or inner part of the swivel motor, which notches are preferably provided on the ends of wings, and in each of which a sealing element of the sealing device is installed. The working chambers are sealed on its long sides by a sealing element. Through the sealing element, which moves inside the working chamber, the working chamber is divided into two areas to which pressure is applied alternately so that the sealing element inside the chamber moves back and forth producing a relative motion between the inner and outer parts of the swivel motor.

As stated above, the sealing elements are preferably installed in the ends of the wings which protrude from the outer and/or inner part. A wing of the inner parts is located between two wings bordering on the working chamber of the outer part and divides the working chamber into two areas.

The sealing elements comprise at least two longitudinal sealing plates and are characterized in that the sealing plates comprise at least one longitudinal and/or transverse slot in which the medium under pressure can enter, which is found in the working chamber. As a rule, this is hydraulic oil. Due to this design, the sealing plates expand in the longitudinal and/or transverse direction so that optimum sealing of the working chamber is insured.

A preferred embodiment of the sealing device is characterized by the sealing element comprising at least one gasket. The size of the gasket is adapted to the size of the sealing plates. At least one of the gaskets is meant to prevent the medium present in the working chamber from flowing through the sealing plate in the transverse direction. At least one gasket is provided.

In another preferred embodiment it is provided that at least one longitudinal and/or transverse slot in the sealing plate extends to its edge where it opens. This can result when operating the swivel motor in a medium under pressure entering the longitudinal and/or transverse slot from the outside and an expansion of the sealing plate in a longitudinal and/or transverse direction. The sealing plate fits the sealing surfaces assigned to it particularly well so that the swivel motor can be constructed with low loss.

A preferable embodiment is characterized in that a plurality of longitudinal slots are provided which run centrally symmetric to the center of the sealing plate. This embodiment makes it possible for the sealing plate to further expand transverse to the longitudinal direction.

In a further preferred embodiment the sealing plate is provided with a plurality of transverse slots which run centrally symmetric to the center of the sealing plate. This achieves the purpose of allowing the sealing plate to continue to expand in the longitudinal direction.

Both embodiments have in common that when two or more deformed sealing plates are stacked they do not lie on top of each other as a result of the centrally-symmetric design of the longitudinal and/or transverse slots of two adjacent sealing plates so that in this case a direct transverse connection between adjacent sealing plates can be avoided.

Another embodiment is preferred because it comprises at least one longitudinal slot and/or at least one transverse slot which is not connected to the edge of the sealing plate, and also not connected indirectly through a longitudinal and/or transverse slot referenced above. This additional longitudinal and/or at least one transverse slot can in turn be applied a medium under pressure so that an additional longitudinal and/or transverse turn of the sealing plate is achieved, which superimposes the deformation which is based on a pressure which rests in the at least one slot opening to the edge of the sealing plate. In this fashion it is possible to influence the deformation of the sealing plate in a targeted way.

Further embodiments are found in the subclaims.

BRIEF DESCRIPTION OF THE DRAWINGS

The invention is described in greater detail using the drawing: It shows:

FIG. 1 is a top view of the long side of a sealing element;

FIG. 2 is a view of the narrow side of a sealing element;

FIG. 4 is a side view of the sealing element with at least two stacked sealing places, which are rotated relative to each other;

Figure 3:
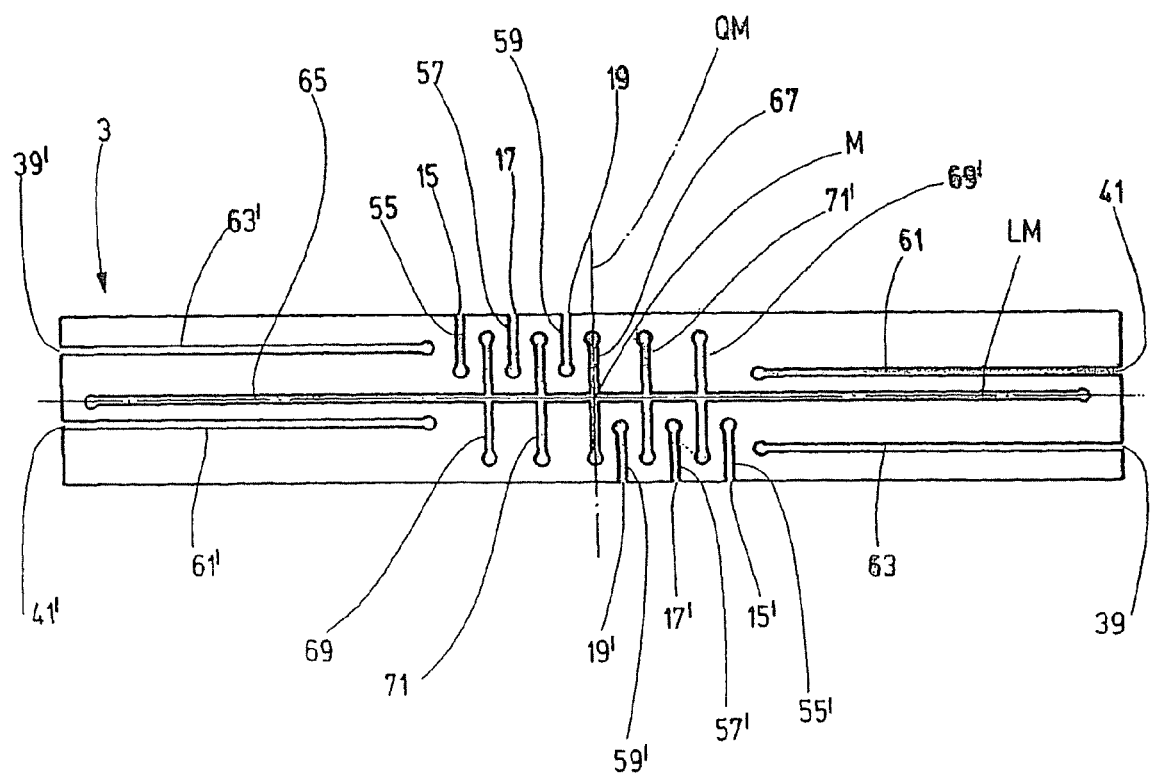
FIG. 3 is a side view of a sealing plate of a sealing element according to FIGS. 1 and 2.

Sealing element 1 illustrated in FIG. 1 comprises at least two, in this case, four stacked sealing plates 3, 5, 7 and 9. In the embodiment shown here, also provided are a gasket 11 placed on upper sealing plate 3 and a sealing plate 3 placed on lower sealing plate 9.

Upper sealing plate 3 is provided with at least one, in this case three, openings 15, 17, 19 left of a posited central level E1. Sealing plate 5 immediately adjacent to the first sealing plate 3 comprises at least one, in this case three, openings 21, 23 and 25 right of the central level E1. The top view shows that the adjacent third sealing plate also has three openings 27, 29 and 31, located to the left of the central level E1. It is apparent that the openings of a sealing plate are located symmetrically to central level E1 across from the adjacent sealing plate. The purpose of this design is to avoid creating a continuous fluid path from above to below according to FIG. 1 is created which would run transverse to sealing element 1.

FIG. 2 shows sealing element 1 in a side view. The same parts are assigned the same reference numbers so that the description of FIG. 1 applies.

Again it is clear that four sealing plates 3, 5, 7, 9 are present which in the embodiment shown here are limited laterally by two gaskets 11 and 13. Sealing plates 3, 5, 7 and 9 located between these gaskets 11 and 13 each contain at least one opening. In the embodiment shown here it is provided that the sealing plate located all the way to the right contains two openings 39 and 41, one of which is arranged below a central level E2 and one above a central level E2. Sealing plate 5 in between has openings 47 and 49, one of which is arranged above and one below a central level E2. Correspondingly, the fourth sealing plate 9 has openings 51 and 53, which are located at the same height as openings 47 and 49 of sealing plate 5.

Here too we see that the openings of adjacent sealing plates do not align, that is they do not overlap, so that no passage openings transverse to sealing element 1 are created.

FIG. 3 shows one of the sealing plates in a side view, which are preferably all identical. In the following, therefore, it is assumed that the sealing plate in question is sealing plate 3.

On the upper side, all three openings 15, 17 and 19 can be seen which are formed by three transverse slots 55, 57 and 59 which penetrate the edge of the sealing plate and run parallel to the transverse central axis QM of sealing plate 3.

Openings 39 and 41, which were discussed in FIG. 2, can be seen on the right narrow side of sealing plate 3. This is where the two longitudinal slots 61 and 63 come together, which run parallel to each other and to the longitudinal central axis LM of sealing plate 3.

On the opposite narrow side of the sealing plate there are two openings 39' and 41', in which two longitudinal slots 61' and 63' come together.

On the underside of the sealing plate there are two openings 15', 17' and 19', in which two transverse slots 55', 57' and 59' come together.

The figure shows that transverse slots 55, 57 and 59 are arranged left of a transverse central axis QM, while transverse slots 55', 57' and 59' are arranged to the right of it [QM].

Overall, it is seen that openings 15, 17, 19 and transverse slots 55, 57, 59, are arranged centrally symmetric to openings 15', 17', 19' and transverse slots 55', 57', 59' centrally symmetric to a midpoint M of sealing plate 3. Accordingly, longitudinal slots 61 and 63 are arranged centrally symmetric to longitudinal slots 61' and 63'. That is shown in this Figure by having the distance of longitudinal slot 61 to longitudinal central axis being the same as the distance of longitudinal slot 61'. The distances of longitudinal slots 63 and 63' to longitudinal central axis LM are set accordingly.

The side view of sealing element 3 shows that all of the transverse and longitudinal slots described here open to the edge of sealing element 3 and can therefore be reached by a medium under pressure of the swivel motor.

However, FIG. 3 also shows that the embodiment of sealing element 3 illustrated here comprises a longitudinal slot 65 running on the longitudinal central axis, which is designed symmetrically to transverse central axis QM, but which does not cut the edge of sealing plate 3. It also shows that it does not have a fluid connection with transverse slots 55, 57, 59, and 55', 57' and 59'.

Longitudinal slot 65 is cut by a transverse slot 67 running to transverse central axis QM, which in turn neither cuts the edge of sealing plate 3 nor has be a fluid connection with longitudinal slots 61, 63, 61', and 63'.

In the embodiment shown here, in addition to transverse slot 67, two transverse slots 69 and/or 69' and 71' are provided to the right and left respectively of the transverse central axis QM, which run symmetrical to the transverse central axis QM and are in a fluid connection with longitudinal slot 65, but not with any other slots of sealing plate 3.

FIG. 3 shows that all slots end in a widening which has a curved, preferably arc-shaped contour. This arrangement serves to insure that sealing plate 3 cannot easily develop cracks on the ends of the slots.

FIG. 4 shows sealing element 1 in a side view, that is, a top view of gasket 13. In the illustration according to FIG. 4, the transverse central axis QM and the longitudinal central axis LM, to which FIG. 3 referred, are labeled. Hidden by gasket 13, sealing plates 3, 5, 7, 9 are rotated 180° relative to each other around the transverse central axis QM. It is shown that due to the centrally symmetric configuration of slots 55, 57, 59, 61 and 63 above and below the longitudinal central axis LM left of the longitudinal central axis four longitudinal slots exist which run parallel to the longitudinal central axis. Accordingly, there are also four parallel [to each other] longitudinal slots to the right of the transverse central axis QM. Accordingly, to the right and left of the transverse central axis QM, there are three transverse slots opening toward the edge above the longitudinal central axis, as well as three transverse slots left and right of the transverse central axis below the longitudinal central axis. To the right and left lateral edges of the sealing element there open viewed from the height of the narrow side two wrapped sealing plates, that is, respectively four longitudinal slots and six transverse slots respectively to the upper and lower longitudinal edges of sealing element 1.

Figure 5:
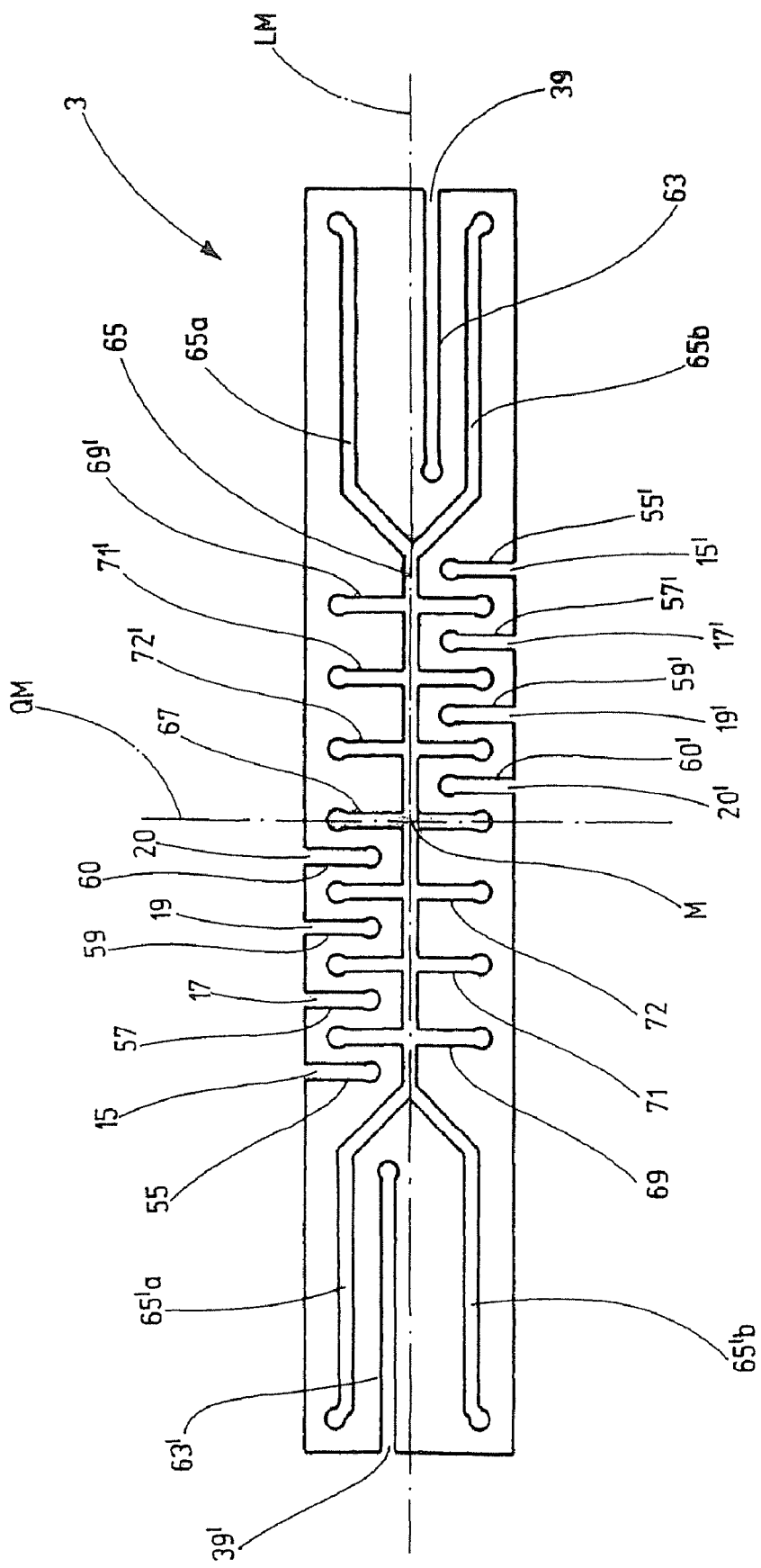
FIG. 5 is a side view of an embodiment of a sealing plate representing a variation of FIG. 3.

FIG. 5 shows a variant embodiment of one of the sealing plates in side view, which preferably all have the same design. That is also why the following assumes that it involves sealing plate 3. The same parts are labeled with the same reference numbers such that reference is made to the previous figures.

The sealing plate shown in FIG. 5 is similar to the one contained in FIG. 3. However, in this case, four openings 15, 17, 19 and 20 are visible on the upper side of the sealing plate, which are formed by four transverse slots 55, 57, 59 and 60 which penetrate the edge of the sealing plate and run parallel to the transverse central axis QM of sealing plate 3.

An opening 39 is visible on the right narrow side of sealing plate 3. A second opening, as seen in FIG. 3, is not required here. Opening 39 forms the junction of a longitudinal slot 63, which runs parallel to the longitudinal central axis LM of sealing plate 3 and here is arranged under it.

An opening 93' is also found on the opposite narrow side of sealing plate 3, which joins with a longitudinal slot 63'.

The underside of sealing plate 3 contains four openings 15', 17', 19' and 20', which join four transverse slots 55', 57', 59' and 60'.

It is seen in FIG. 5 that transverse slots 55, 57, 59 and 60 are arranged to the left of transverse central axis QM, while transverse slots 55', 57', 59' and 60' are arranged to the right of it.

On the whole, it is shown, similar to openings 15, 17, 19 and 20 and transverse slots 55, 57, 59, 60 to openings 15', 17', 19' and 20' and transverse slots 55', 57', 59' and 60' are arranged centrally symmetric to longitudinal slot 63'. Accordingly, longitudinal slot 63 is arranged centrally symmetric to longitudinal slot 63'. This is shown by the fact that the distance of longitudinal slot 63 to the longitudinal central axis LM is as great as the distance of longitudinal slot 63' to longitudinal central axis LM.

As the side view of sealing element 3 reproduced in FIG. 5 shows, all transverse and longitudinal slots referenced so far open on the edge of sealing element 3 and are therefore reachable for a medium under pressure of the swivel motor. This [medium] can also penetrate through the corresponding openings of the slots.

However, FIG. 5 also shows that the embodiment shown here of sealing element 3 comprises a longitudinal slot 65 running on the longitudinal central axis LM, which does not cut the edge of sealing plate 3.

Unlike the embodiment depicted in FIG. 3, longitudinal slot 65 does not extend the entire width of the sealing element 3. It branches right and left respectively of transverse slots 69, 69' into two semi-longitudinal slots 65a, 65b and 65'a and 65'b.

The two semi-longitudinal slots 65a, 65b are arranged to the right of transverse central axis QM, while semi-longitudinal slots 65'a and 65'b are arranged to the left of the same. The total length of the longitudinal slot is selected in such a way that it extends the entire length of the sealing plate 3. Semi-longitudinal slots 65a, 65b and 65'a and 65'b are arranged symmetrical with respect to the transverse central axis. They also run symmetrically to longitudinal central axis LM.

FIG. 5 shows that the semi-longitudinal slots run in a distance to the upper and/or lower side of the sealing plate. It is preferably provided that the semi-longitudinal slots have bent end areas which run outwardly in the edges of sealing plate 3 with respect to the longitudinal central axis.

A comparison of FIG. 5 with FIG. 3 shows that the edges of sealing plate 3 in the embodiment according to FIG. 5 are more stable because they do not contain any detached end sections, but comprise internally located outwardly closed semi-longitudinal slots. If we examine the embodiment according to FIG. 3 it is shown that in this case longitudinal slots 61, 63 and 61', 63' run at a distance from the upper and/or lower side of sealing plate 3 so that relatively thin tongues are created between the longitudinal slots and the upper and/or lower side. These are sensitive.

Due to the fact that in the embodiment according to FIG. 5, longitudinal slots 63 and 63' run in a greater distance to the upper and/or lower side of sealing plate 3, more stable edge areas of sealing plate 3 are realized, in which no openings are found on the outer edge of sealing plate 3. Rather, it is clear that precisely in the edge areas semi-longitudinal slots closed to the outside are present so that a relatively stable edge area of sealing plate 3 is given.

In FIG. 5, it is clear as in all other illustrations, that the slots running inside sealing plate 5 all have rounded end areas. These prevent tearing of sealing plate 3 in these end areas when pressure is applied to the slots.

The configuration of the sealing plates shown in FIGS. 1 and 2 insures that the sealing plates adjacent to the longitudinal and transverse slots opening toward the edge are not stacked on top of each other, so that no penetration channels run through sealing element 1 in their area and a short circuit is avoided between the areas divided by sealing element 1.

However all sealing plates 3, 5, 7 and 9 are provided with a longitudinal channel 65 with a total of five transverse slots 67, 69, 69', 71, 71' (see FIGS. 3 and 4) and/or seven transverse slots 67, 69, 69', 71, 71', 72, 72' (see FIG. 5), which do not all cut the edge of the sealing plates, but are also not connected through longitudinal or transverse slots with the area surrounding the sealing plate.

Gaskets 11 and 13 have respectively at least one opening which has a fluid connection with the slots which do not cut the edge of the sealing plates. That is, using these openings, a closed system of slots is achievable. For example, an opening can be provided which penetrates the gaskets vertically to the visual level of FIG. 4 and which is provided at the intersection of the transverse and longitudinal central axes.

The following is a more detailed discussion of the action of the longitudinal and transverse slots.

In the outer part and inner part, in particular in the wings of the outer and inner parts of a job motor, sealing elements are used of the type discussed in this patent. Grooves are used in the outer and inner parts and/or in the ends of the associated wings, slots which accept the sealing elements. The depth of the grooves is selected in such a way that the longitudinal edge protruding from the groove of the sealing element with a surface of the opposite part comes in sealing contact. That is, a sealing element in the inner part contacts the inner surface of the outer part, while a sealing element in the outer part makes sealing contact with the outer surface of the inner part. In order to achieve optimum sealing effect, a corresponding contact pressure is insured on the longitudinal edges of the sealing elements.

On the inner side of the outer part and on the outer side of the inner part, projections known as wings are provided on whose ends the sealing elements are installed. The volume of the working chamber is therefore not only defined by the area radially projecting from the outer or inner part of the respective sealing element.

Also under different temperature and pressure conditions, sufficient contact pressure is required by the sealing elements on the associated opposite part. The working chambers are closed on their front by gaskets or similar to which the sealing element are adjacent with their narrow sides. Here too sufficient contact pressure is required to insure optimum sealing of the working chamber and/or of the wing which moves inside it. If when the swivel motor is operating the sealing element has a higher pressure applied to it on the one side compared to the other, the sealing element with the gasket turned away from the pressure side will be pressed against the partition wall of the groove accepting the sealing element. On the side with the higher pressure a minimal crack is created through which the medium under pressure in the working chamber can penetrate between the appropriate partition wall of the groove and the sealing element.

Due to the fact that the sealing plates of the sealing element are centrally symmetric and are designed in such a way that they do not align with the slots present in the adjacent sealing plates which are in fluid connection with the edge area of a sealing plate, a medium which has entered the crack is unable to penetrate the sealing element.

The sealing effect of a sealing element can be improved by at least one gasket. In so doing it is possible to provide at least one gasket between the sealing plates. Preferably, the sealing elements are designed in such a way that the sealing plates lie between two gaskets which form the partition wall of a sealing element seen from its longitudinal direction.

If we look at the sealing element shown in FIG. 1, we see that it comprises a number of thin contiguous sealing plates. FIG. 1 shows a virtual top view of a sealing element, such as is directly installed in an inner part or outer part, or as described above, in a wing projecting from the outer part or inner part. The sealing element extends in a longitudinal direction of the outer or inner part. It is therefore adjacent to the inner surface of the outer part from the inner surface of the inner part and/or begins from the inner surface of the inner part to the outer surface of the outer part. The inner and/or outer surface of the inner and/or outer part are curved, preferably arched, whereby the sealing elements with their long side turned toward the viewer in FIG. 1 must adapt to the contour of the outer and/or inner surface. As a number of contiguous sealing plates are provided, the sealing places located more in the center of a sealing element can shift further outward with respect to the others that the long side of the sealing element turned toward the viewer can adapt to the contour of the outer and/or long side.

Figure 6:
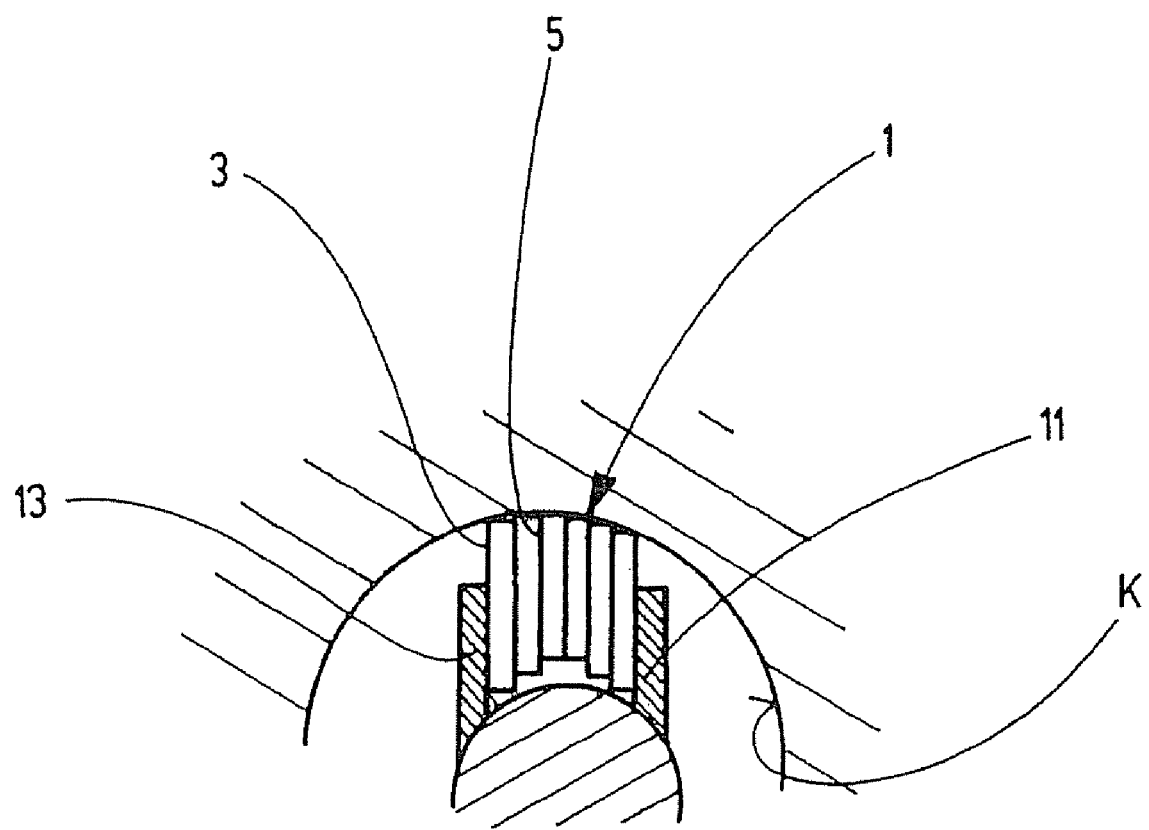
FIG. 6 is a cross-section of a swivel motor with a sealing element.

The simplified view according to FIG. 6 shows in cross section a sealing element 1, comprising a number of contiguous thin sealing plates, 3, 5, etc. Gaskets 11 and 13 are provided to the right and left of the sealing plate package. These are provided, for example, on the outer side of the inner side. As the sealing plates are movably mounted in a radial direction between gaskets 11 and 13, they can be applied to the inner contour of the outer part. Therefore, the sealing plates applied to gaskets 11 and 13 lie radially further inward as the sealing plates at a distance from gaskets 11 and 13. The radially different configuration of the sealing plates cannot of course be seen in the top view contained in FIG. 1.

In order to improve the sealing effect of the sealing element, the thinnest possible sealing plates are used, whose thickness is, for example, between 0.4 and 0.5 mm. As the sealing plates contain metal at least in the contact area with the inner surface of the outer surface and the outer surface of the inner surface, are preferably made entirely out of metal, the contact areas are relatively low-abrasion. The longitudinal edges of the thin sealing plates lie respectively in a sealing fashion against the outer and/or inner surfaces.

In order to improve the sealing effect of the sealing plates during swivel motor operation, the slots described above are provided.

It is clear from the specifications that slots can be provided which are open to the outside, that is, they cut the edge of a sealing plate so that medium under pressure can enter these slots. It can be seen with special clarity from the run of the slots shown in FIGS. 3, 4 and 5 that due to transverse slots 55, 57, 59 and 60 as well as 55', 57', 59' and 60' that the sealing plates expand in a longitudinal direction, while on the other hand, due to longitudinal slots 61, 63, 61' and 63' in the transverse direction. That is, under the effect of the medium entering the slots through the edge of the sealing plates is for the slots to sit with its narrow side and its long side against the surfaces to be sealed. If one views FIGS. 3 and 5, for example, the upper edge of the sealing element or the outer surface of the inner part sits, which the lower edge is supported in slot and there functions as a seal which accepts the sealing element.

In addition, FIGS. 3, 4 and 5 make clear that it is possible to widen the sealing plates in a transverse and longitudinal direction by providing slots inside the sealing plates which do not cut the outer edge of a sealing plate and which do not have a fluid connection with such slots which cut the edge. If we look at FIGS. 3 and 5, we see that the sealing plates and therefore the sealing element widen through transverse slots 67, 69, 71, 69', 71' and 72' in a longitudinal direction and through longitudinal lot 65 and semi-longitudinal slots 65a, 65b, 65'a and 65'b they expand in a transverse direction.

It is shown then that an expansion of the sealing plates in the longitudinal or transverse direction can be achieved both by slots which are connected to the edge of the sealing plates, that is they are outwardly open, and by slots which do not contact the edge of the sealing plates, that is, they run entirely inside the sealing plates.

Especially preferred, however, is an embodiment of the sealing element in which the sealing plates have both outwardly open slots as well as outwardly closed slots.

In case slots are provided in sealing plates which do not cut the edge of a sealing plate and are also not connected to slots which cut the edge of the sealing plate, care must be taken that the slots closed toward the outside can have the medium under pressure applied to them. That results from the sealing elements being provided with at least two gaskets, at least one of which is described in greater detail below, whereby the sealing plates are arranged between the gaskets. Through the gaskets, the slots which are provided in a sealing plate which are connected with the edge of a sealing plate are laterally closed, so that the medium under pressure can exclusively reach the openings on the edge of the sealing plates leading to the slots. The slots lying in the inside, which are not in a fluid connection with the edge of the sealing plate, are supplied with the fluid under pressure by the at least one opening in the gaskets. The opening should be kept small in order to minimize transverse leaking.

It was explained above that in the event of pressure applied to only one side of the sealing element, that is, in the event of a pressure difference on the two long sides of a sealing element, a minimal crack is created between the sealing element and a partition wall of the accepting groove of the sealing element. As a result of this the medium under pressure can reach the outer side of the gasket and penetrate the gasket through the at least one opening. The opening is provided in such a way that it is has a fluid connection with the inner, outwardly closed slots of a sealing plate, as the inner slots are designed symmetrically the slots are connected to adjacent plates. A medium under pressure can reach the outwardly closed slots of all sealing plates of a sealing element through the opening in the gasket. If an additional gasket is present inside a sealing element, it must also contain an opening which has a fluid connection with the outwardly closed slots.

This makes it possible for the medium on the pressure side to pass through the opening present in the gasket and to further pass through the opening in the gasket in which at least one longitudinal and/or transverse lot which is not in a fluid connection with the edge of sealing element 1. That is, the medium can pass through all sealing plates up to the opposite gasket. There, however, it cannot exit the opening present there because the gasket is contacted with high pressure against the associated partition wall of the groove, which results in the closing of the opening.

It is apparent from FIGS. 3 and 5 that a medium under pressure which reaches longitudinal slot 65 and semi-longitudinal slots 65a, 65b, 65a', 65b', expands them, so that the upper edge bends upward and the lower edge and the lower edge of sealing element 3 bends downward. As a result, the contact pressure of the upper edge and the lower edge of sealing element 3 increases, on the one hand, on the corresponding part of the swivel motor and, on the other, the base of the groove. This results in improved sealing effect in the area of the longitudinal edges of the sealing element.

However, the medium under pressure also results in expanding transverse slots 67, 69, 71, 72, 69', 71' and 72' running perpendicular to longitudinal slot 65 so that the essentially rectangular sealing element 3 also expands in the longitudinal direction, so that its narrow sides show an increased contact pressure and pressure effect.

If high pressure is applied on one side of sealing element 3, the medium passes through its longitudinal or narrow sides through openings 15, 17, 19, 20, 15', 17', 19', 20' and 39, 41 as well as 39', 41' into transverse slots 55, 57, 59, 60, 55', 57', 59', 60' and into longitudinal slots 61, 63, as well as 61' and 63'. This results in the longitudinal and transverse slots being expanded and sealing element 3 expanding in both the longitudinal and transverse direction.

With regard to the deformation of sealing element 3 along its longitudinal edges, the following can be said:

If pressure is applied to longitudinal slot 65 and semi-longitudinal slots 65a, 65b, 65'a and 65'b, an expansion occurs, whereby the maximum expansion will occur in the area of the transverse central axis QM. Without restraining the sealing element in an outer or inner part of a swivel motor the longitudinal edges would be curved convexly inward, whereby the maximum swelling would be in the area of the transverse central axis QM.

A medium entering from the outside through openings 39, 41, 39', 41' into longitudinal slots 61, 63 and 61', 63', which is under high pressure, results in widening of these longitudinal slots. In this situation, however, the outer areas of the longitudinal edges of the sealing element are moved further outward than the inner areas. That is due to the fact that the inner ends of longitudinal slots 61, 63, 61', 63' end at a distance from transverse central axis QM. The longitudinal edges of the sealing element would, is pressure were introduced exclusively to longitudinal slots 61, 63, 61', 63', be bend concavely outward, that is at the farthest, into the areas outside of longitudinal central axis LM, which is farthest from transverse central axis QM.

This show that by superimposing the deformation of the longitudinal edges of the sealing plate, on the one hand, due to the prevailing pressure on the inside and, on the other, due to the pressure from the outside exerted through openings 39, 41, 39', 41' that the longitudinal edges of the sealing element are not so much curved with respect to longitudinal central axis LM as shifted parallel to it. As a result, the contact pressure of sealing element 3, on the one hand, is harmonized on the base of the groove and, on the other, harmonized on the opposite part of the swivel motor—seen through the longitudinal extension of the longitudinal edges of the sealing element.

Overall it is clear that the elongation properties of the sealing element can be influenced by the number of longitudinal and/or transverse slots which open in the area of the edge of the sealing plate and by the number of longitudinal and/or transverse slots which run inside the sealing element.

In the sealing device described here it is provided that the sealing elements are preferably made of metal and the gaskets are preferably made of an elastic material, in particular plastic. Particularly preferred is PTFE (polytetrafluoroetylene).

The number of sealing plates per sealing element can be adjusted to the respective application. It is also possible to provide sealing elements with a gasket which is placed between two sealing plates. If this is the only gasket of a sealing element, this cannot have a passageway. The longitudinal and transverse slots inside the sealing plates are then fed with the medium under pressure through a crack created between a sealing plate and the partition wall of a groove.

However, especially preferred is the sealing element which was described using FIGS. 1 through 5, and which comprises a number of stacked sealing plates and two laterally provided gaskets.

It is clear from the descriptions that sealing elements with sealing plates that do not contain internal outwardly closed slots it is possible to dispense with a gasket if the transverse and longitudinal slots connected to the edge of a sealing plate are arranged in such a way that slots in adjacent plates do not overlap. If, for example, the slots are designed in a centrally symmetric fashion, identical sealing plates can be used, which are placed on top of each other with alternating orientation. According to the view in FIGS. 3 and 5, a package of such sealing plates perpendicular to the visual level is practically sealed because the slots connected to the edge of the sealing plate are covered by adjacent sealing plates.

Preferred, however, as stated above, are sealing elements with sealing plates which not only comprise outwardly open slots, but also outwardly closed slots in order to be able to compensate. Since the slots located on the inside are designed symmetrically, these would allow a medium under pressure to pass through a package of sealing plates. This must then be avoided by the at least one gasket described above.

REFERENCE LIST

1 Sealing element
3 Sealing plate
5 Sealing plate
7 Sealing plate
9 Sealing plate
11 Gasket
13 Gasket
15 Opening
15' Opening
17 Opening
17' Opening
19 Opening
19' Opening
21 Opening
23 Opening
25 Opening
27 Opening
29 Opening
3' Opening
33 Opening
35 Opening
37 Opening
39 Opening
39' Opening
41 Opening
41' Opening
43 Opening
45 Opening
47 Opening
49 Opening
51 Opening
53 Opening
55 Transverse slot
55' Transverse slot
57 Transverse slot
57' Transverse slot
59 Transverse slot
59' Transverse slot
60 Transverse slot
61 Longitudinal slot
61' Longitudinal slot
63 Longitudinal slot
63' Longitudinal slot
65 Longitudinal slot
65ab Semi-longitudinal slot 65'ab Semi-longitudinal slot
67 Transverse slot
67' Longitudinal slot
69 Transverse slot
69' Transverse slot
71 Transverse slot
71' Transverse slot
E Central level
QM Transverse Central Axis
M Center
LM Longitudinal Central Axis

The invention claimed is:

1. A sealing device for a swivel motor having an outer part, an inner part and at least one working chamber located therebetween, the sealing device comprising: at least two elongated sealing elements housed in respective grooves of the outer and/or inner part running essentially parallel to the swivel axis of the swivel motor which comprise at least two elongated sealing plates, whereby at least one of the sealing plates includes at least one longitudinal and/or one transverse slot in which a medium under pressure can enter the at least one slot, a first longitudinal slot of the at least one longitudinal slot branches into two semi-longitudinal slots.

2. The sealing device according to claim 1, wherein the total length of the longitudinal slot and the semi-longitudinal slots is such that it substantially extends over the entire length of the sealing plate.

3. The sealing device according to claim 1, wherein the longitudinal slot and the semi-longitudinal slots are closed with respect to other slots and with respect to an edge of the sealing plate.

4. The sealing device according to claim 1, wherein the semi-longitudinal slots run at a distance to an upper and/or lower side of the sealing plate.

5. The sealing device according to claim 1, wherein the semi-longitudinal slots have curved end areas that run outwardly with respect to a longitudinal central axis in the corners of the sealing plate.

6. The sealing device according to claim 1, wherein the at least two sealing plates includes a plurality of adjacent sealing plates.

7. The sealing device according to claim 1, wherein the sealing elements comprise at least one gasket.

8. The sealing device according to claim 7, wherein the at least one gasket has an opening that is connected with the at least one longitudinal and/or at least one transverse slot that is closed with respect to the other slots and with respect to the edge.

9. The sealing device according to claim 7, wherein the at least one gasket is made of plastic.

10. The sealing device according to claim 1, wherein at least one of the longitudinal and/or transverse slots opens to the edge of the sealing plate.

11. The sealing device according to claim 1, wherein a plurality of longitudinal slots is provided that run centrally symmetric to a center of the sealing plate.

12. The sealing device according to claim 1, wherein a plurality of transverse slots is provided that run centrally symmetric to the center of the sealing plate.

13. The sealing device according to claim 1, wherein at least one longitudinal slot and/or at least one transverse slot is provided that is closed with respect to the other slots and with respect to the edge of the sealing plate.

14. The sealing device according to claim 13, wherein the at least one longitudinal slot and the at least one transverse slot run symmetrically to a longitudinal central axis and to a transverse central axis.

15. The sealing device according to claim 13, wherein a longitudinal slot extends substantially over an entire length of the sealing plate and a number of transverse slots extend substantially over an entire width of the sealing plate.

16. The sealing device according to claim 13, wherein the longitudinal slot and semi-longitudinal slots originating from it extend substantially over an entire length of the sealing plate and a number of transverse slots extend substantially over an entire width of the sealing plate.

17. The sealing device according to claim 1, wherein the at least one longitudinal slot, the semi-longitudinal slots originating from it and the at least one transverse slot run symmetrically to a longitudinal central axis and to a transverse central axis.

18. The sealing device according to claim 1, further comprising one gasket lying between two adjacent sealing plates.

19. The sealing device according to claim 1, further comprising two gaskets laterally bordering the sealing element.

20. The sealing device according to claim 1, wherein the at least one sealing plate is made of metal.

21. The sealing device according to claim 1, wherein the at least one sealing plate has a thickness of approximately 0.4 mm to approximately 0.5 mm.

22. The sealing device according to claim 1, wherein the at least one sealing plate has corner areas that are free of openings on the outer edge of the sealing plate.

* * * * *